United States Patent Office 3,363,523
Patented Jan. 16, 1968

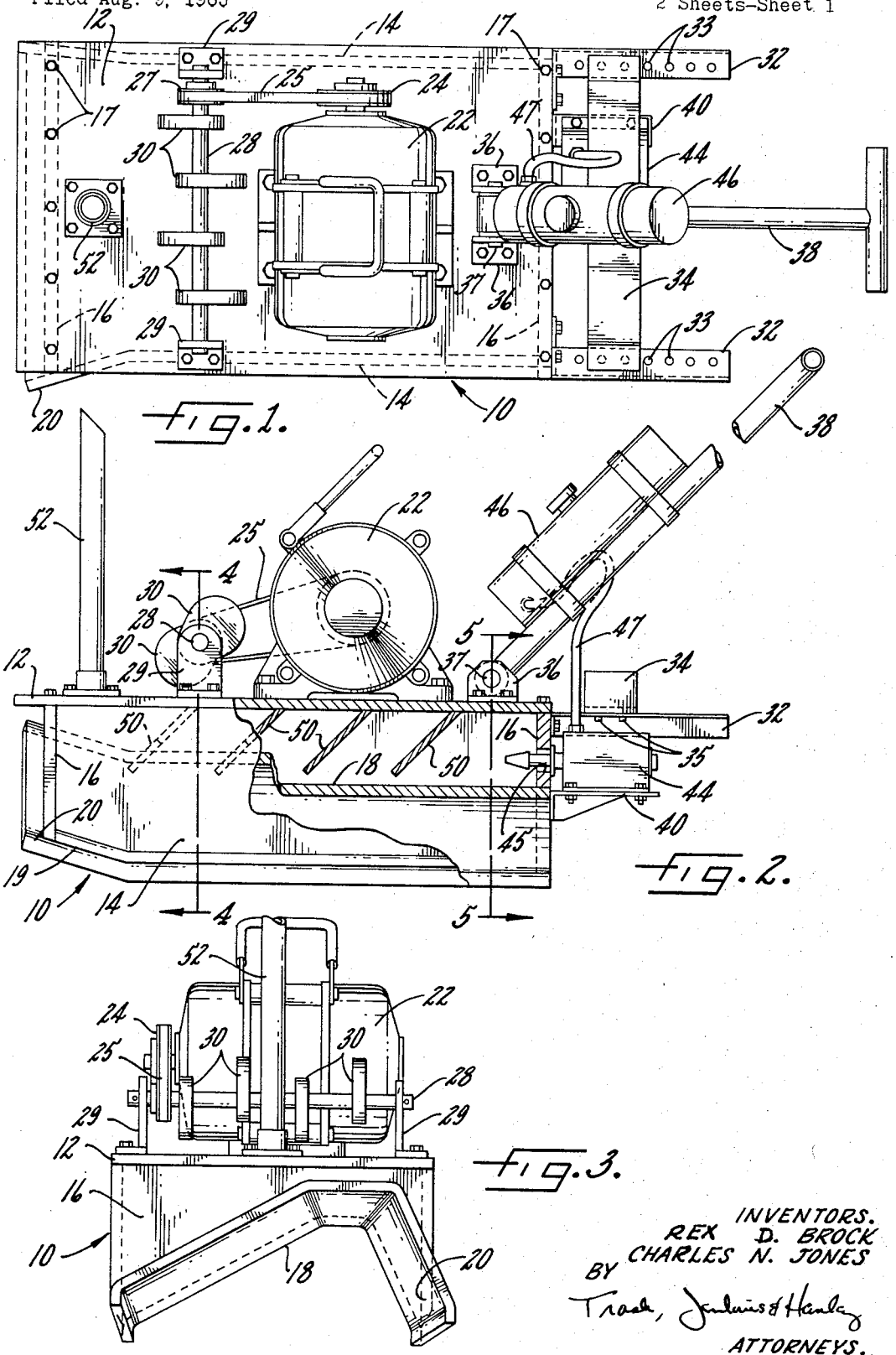

3,363,523
PAVEMENT FORMING APPARATUS
Rex D. Brock and Charles N. Jones, Anderson, Ind., assignors to Acme Paving Company, Inc., Anderson, Ind., a corporation of Indiana
Filed Aug. 9, 1965, Ser. No. 478,267
2 Claims. (Cl. 94—46)

ABSTRACT OF THE DISCLOSURE

An apparatus for forming paving material into the curbs or the like having a mold plate carried in a housing. Eccentrics connected to a motor are mounted on the housing to vibrate the mold plate for compacting the paving material and causing the apparatus to advance itself over said paving material.

---

This invention relates to an apparatus for forming paved curbs and similar type structures.

It is an object of the invention to provide an apparatus which will simultaneously mold and compact curbs and similar type structures, which can be easily adapted for molding such curbs and similar structures of different cross-sections, which can be easily manipulated, and which will be self-propelled.

In accordance with the preferred form of the invention, there is provided a housing having a top plate interconnecting a pair of side walls. A pair of end plates are mounted on the top-plate and carry an elongated mold plate having a cross-sectional configuration corresponding to the desired cross-section of the structure to be formed. A handle is swingably mounted on the top plate and projects upwardly and rearwardly therefrom for guiding and controlling the movements of the apparatus.

The apparatus is propelled by a motor mounted on the top plate and connected by suitable drive means to one or more eccentrics mounted on the top plate. Upon rotation, the eccentrics vibrate the entire housing to cause the mold plate to vibrate and compact the paving material being molded and to further cause the apparatus to "walk" in the direction of rotation of the eccentrics for thus advancing the apparatus along the paving material. A counter-weight is adjustably mounted on the apparatus at the rear of the housing to keep the forward end of the mold plate slightly elevated and facilitate forward movement of the apparatus and provide additional weight to facilitate compaction of the paving material.

The mold and top plates are disposed in vertically spaced relation to each other, and a burner is mounted on the housing to inject flames and heated gases into the space between said plates for thus heating the mold plate to facilitate the formation of curbs and similar structures from bituminous paving materials. Desirably, baffles are mounted along the housing for deflecting the burner flames and gases onto said mold plate, and an exhaust stack is provided on the housing to vent the spent gases and heat injected into the housing by the burner.

Other objects and features of the invention will become apparent from the more detailed description which follows and from the accompanying drawings, in which:

FIG. 1 is a plan view of an apparatus embodying the invention;

FIG. 2 is a side elevation of the apparatus shown in FIG. 1, but showing portions thereof broken away;

FIG. 3 is a front elevation of the apparatus shown in FIG. 1;

Figure 4:
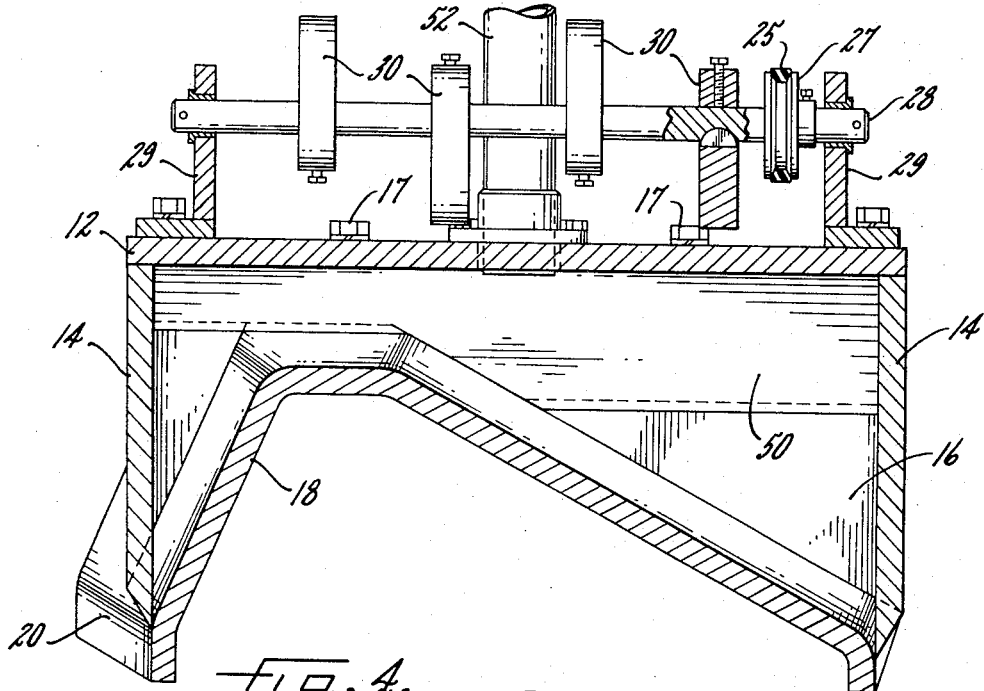
FIG. 4 is a vertical section taken on the line 4—4 of FIG. 2.
Figure 5:
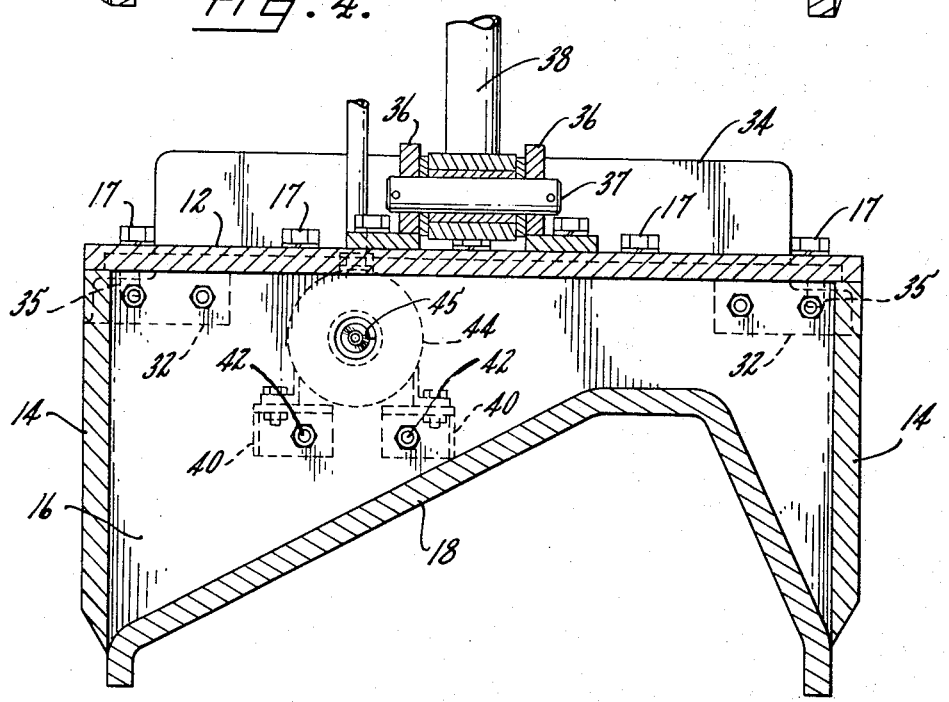
FIG. 5 is a vertical section taken on the line 5—5 of FIG. 2.

Our invention is primarily adapted for forming and compacting curbs and similar type structures made from bituminous paving materials. However, it is to be understood that it can be used for forming such curbs and structures from any desired type of paving materials.

As shown, there is provided a housing 10 comprising a generally rectangularly shaped top plate 12 connected along its longitudinal edges to a pair of depending side walls 14. A pair of end plates 16 are removably mounted at the opposed ends of the housing by bolts 17 extending downwardly through the top plate 12. The end plates 16 are connected at their lower ends to an elongated, open-ended, channeled mold plate 18. Said mold plate has a configuration corresponding to the cross-section of the structure to be formed, and its longitudinal edges project downwardly below the side walls 14 for engagement with the surface upon which the material is being formed. Thus, by removing the end walls 16 and mold plate 18, new end wall and mold plate combinations can be mounted on the housing for forming structures of different cross-sectional shapes. As shown in FIG. 2, the forward end of one of the side walls 14 has its lower end tapered upwardly, as at 19, and the adjacent edge of the mold plate 18 is flared upwardly and outwardly, as at 20. In this manner, the mold plate 18 is provided with an enlarged throat at its forward end to facilitate movement of the apparatus over the paving material and guide the reception of said paving material into the housing under the mold plate.

A motor 22 is mounted on the top plate adjacent the rear of the housing. Said motor is provided with a pulley 24 connected by a belt 25 to a pulley 27 mounted on an axle 28 extending transversely of the apparatus and journaled in a plurality of pillow blocks 29 mounted on the top plate 12. A plurality of laterally spaced eccentrics 30 are mounted on the axle 28 for rotation therewith. Said eccentrics, upon rotation of the axle 28, create a vibration which is transmitted through the housing to the mold plate to thus cause the mold plate to effect a tamping action to compact the paving material thereunder. Such vibration also causes the apparatus to "walk" or move in the direction of the eccentric rotation. Desirably, to prevent the vibration from causing the mold plate to dig into the paving material, the axle 28 is located longitudinally of the top plate rearwardly of the mold plate throat. A pair of laterally spaced arms 32 are mounted on the rear end walls 16 and have a plurality of longitudinally spaced openings 33 formed therein. A counter-weight 34 is supported on the arms 32 and has downwardly projecting pins 35 receivable in the arm openings 33 for releasably locating said counter-weight in the desired longitudinal position along the length of said arms. By adjusting the positioning of the counter-weight along the length of the arms, the upward tilt of the forward end of the apparatus is controllable to keep the forward end of the mold plate tilted slightly upwardly and to adjust the speed at which the apparatus "walks" forwardly upon rotation of the eccentrics 30. The counter-weight further serves to provide additional weight to the apparatus to increase the effectiveness of the tamping action of the mold plate against the paving material. A pair of brackets 36 are mounted on the top plate adjacent the rear thereof and are swingably connected by a pivot pin 37 to a handle 38 for controlling the movements of the apparatus.

In order to properly form a curb or similar structure from a bituminous material, said material should be heated during its molding and compaction by the mold plate. To this end, a pair of brackets 40 are mounted on the rear end wall 16 by bolts 42. Said brackets support a gas burner 44 adapted to direct heat in the form of flame and hot gases through an opening 45 in the rear end wall and into the space between the mold and top plates. Conveniently, the fuel for the burner 44 is supplied from a tank 46 mounted on the handle 38 and connected to said burner by a flexible conduit 47. The flame and heated gases are directed downwardly onto the mold plate 18 by a plurality of longitudinally spaced baffle plates 50 mounted on the underside of the top plate 12 and angled toward the forward end of the housing. The spent gases are exhausted from the housing by an exhaust stack 52 mounted on the top plate adjacent the forward end thereof and in open communication with the space between the mold and top plates.

In operation of the apparatus, as forming a curb from bituminous paving material, the paving material is laid on the surface upon which the curb is to be formed, and our apparatus is moved thereover. The burner 44 is ignited to project its flame and heated gases into the space between the top and mold plates 12 and 18 with the baffles 50 directing said flame and gases onto said mold plate. The counter-weight 34 is longitudinally adjusted on the arms 32 to properly balance the apparatus to move it at the desired rate over the paving material and to tilt the forward end of the mold plate slightly upwardly. The motor 22 driving the eccentrics 30 causes the eccentrics to vibrate the apparatus for moving it along over the paving material. As the apparatus is moved over the paving material, the mold plate 18 will contact the exposed portions of said paving material and, because of the vibration transmitted to it from the eccentrics 30, said mold plate will compact the paving material and form it into the desired shape. The enlarged throat at the forward end of the housing provided by the mold plate extension 20 guides the paving material into and under the mold plate for compaction and forming. It is to be understood, of course, that when the curb is being formed from a material which does not need to be heated, the burner 44 need not be employed.

We claim:

1. A pavement forming apparatus, comprising a housing having a top wall and front and rear end walls, an open ended mold plate mounted on said end walls in spaced relation to said top wall to engage the paving material to be formed, means for heating the space between said top wall and mold plate, a plurality of eccentrics carried on an axle extending transversely of said top wall, means for rotating said eccentrics to vibrate said mold plate and advance the apparatus over said paving material, a pair of arms mounted on said rear wall and projecting rearwardly therefrom, a counter-weight adjustably mounted on said arms, and a handle mounted on said housing for guiding the apparatus.

2. The invention as set forth in claim 1 in which said means for heating the space between said top wall and mold plate comprises a burner mounted on said rear end wall and a plurality of baffle plates mounted in said space for directing the heat from said burner onto said mold plate.

References Cited

UNITED STATES PATENTS

| 2,044,883 | 6/1936 | Jackson | 94—46 |
| 2,303,812 | 12/1942 | Barber | 94—45 |
| 2,541,547 | 2/1951 | Robinson | 94—46 |
| 2,737,094 | 3/1956 | Jackson | 94—48 |
| 2,771,012 | 11/1956 | Jackson | 94—48 |
| 3,161,117 | 12/1964 | Supject | 94—46 |

OTHER REFERENCES

Etnyre: Heavy Automatic Curb Paver, Bulletin No. CP–105, pp. 1–4. (Copy in Group 354.)

JACOB L. NACKENOFF, *Primary Examiner.*